Oct. 30, 1945. W. T. PROWD 2,388,179
PIPE COUPLING
Filed Jan. 15, 1944
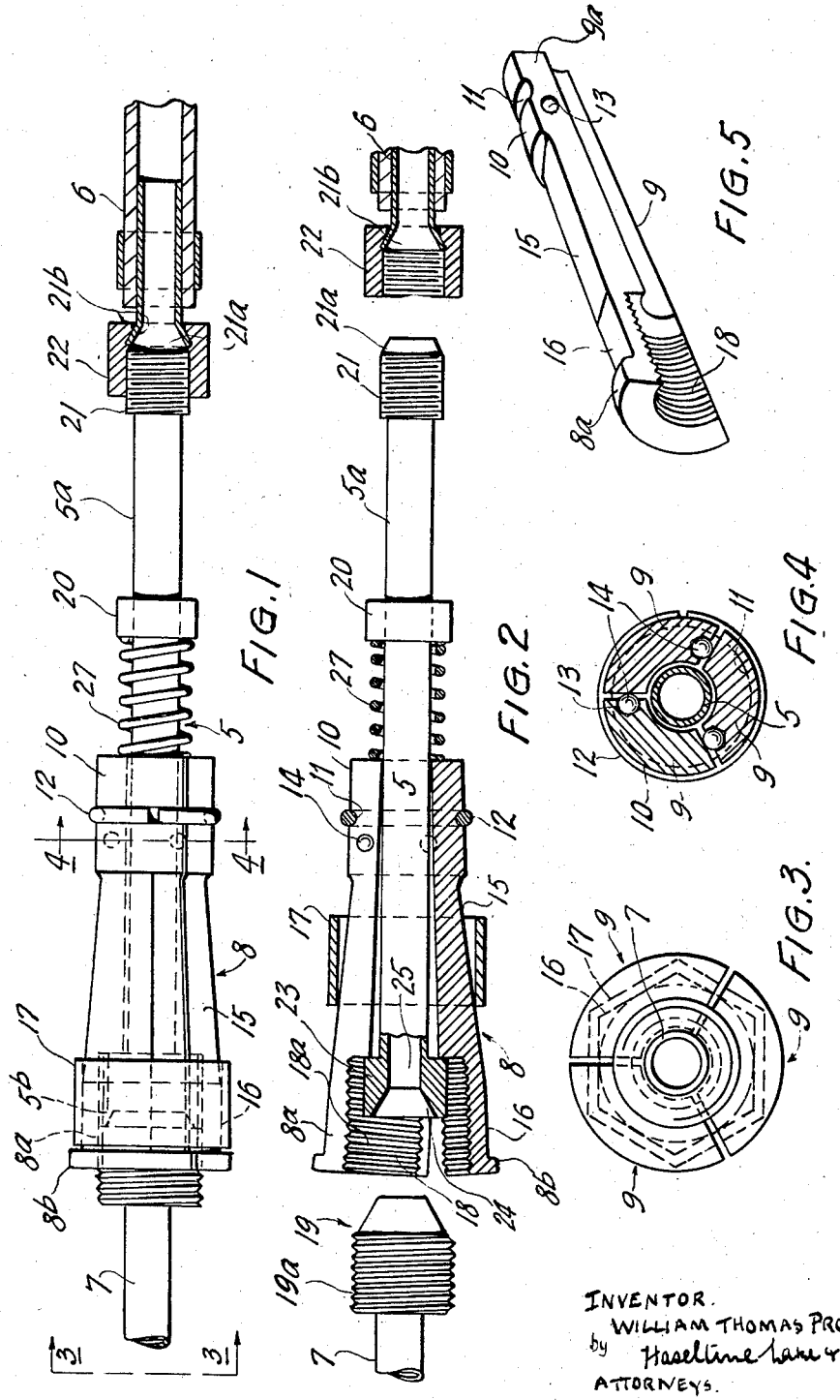
INVENTOR.
WILLIAM THOMAS PROWD.
by Haseltine Lake & Co.
ATTORNEYS.

Patented Oct. 30, 1945

2,388,179

UNITED STATES PATENT OFFICE 2,388,179

PIPE COUPLING

William Thomas Prowd, Middle Park, Victoria, Australia

Application January 15, 1944, Serial No. 518,343
In Australia February 6, 1943

4 Claims. (Cl. 285—150)

This invention relates to pipe coupling for coupling high or low pressure fluid pipe lines and is particularly though not exclusively adapted for use where temporary coupling of pipes is required, e. g. testing purposes.

In the testing of fluid operated apparatus, either under high or low pressure, it is necessary to provide a completely sealed coupling which usually is effected by couplings including interengaging threaded members requiring tedious and time wasting labour in engaging and disengaging said members in coupling and uncoupling the pipes.

The primary object of the present invention is to provide a simple and conveniently operable pipe coupling providing substantially all the sealing advantages of known types of couplings and capable of expeditious engagement or disengagement without requiring excessive thread engaging movements, whereby the coupling operation may be effected without the requirement of rotating the pipes.

With the above stated objects in view, there is provided a pipe coupling comprising a tube, a sleeve rotatable relatively to, and so arranged upon said tube that one end of the latter extends outwardly for fluid tight connection with a pipe to be coupled with its other end recessed within the opposite internally threaded end of said sleeve, one part of a pipe union arranged upon the recessed end of said tube, an externally threaded complementary union part upon the end of the other pipe to be coupled, said internally threaded end of the sleeve radially expansible to permit the free introduction of said complementary union part, and means for contracting the expansible end of said sleeve into threaded engagement with said complementary union part so as to effect, by the subsequent rotation of said sleeve, fluid tight engagement between said union and complementary union parts.

By the arrangement stated two pipes may be conveniently coupled without the requirement of turning or rotating the same by first attaching the external end of the tube to one of said pipes. The other pipe carrying the externally threaded union part is then axially introduced into the expanded end of the sleeve, and upon the contraction of that end of the sleeve, the latter is rotated to draw the union parts into fluid tight engagement, whereby each pipe is then coupled by the tube. The external end of the tube may be permanently attached to one pipe for testing other pipes against fluid pressure and for that purpose the expansible and contractible sleeve provides a most effective and expeditious means for coupling and decoupling the pipes to be tested.

The accompanying drawing depicts a practical arrangement of the invention and in the drawing—

Fig. 1 is a side elevation of the pipe coupling.

Fig. 2 is a vertical central section of the coupling illustrated in Fig. 1.

Fig. 3 is an end elevation of Fig. 1, drawn to a larger scale.

Fig. 4 is a section taken in line 4—4 of Fig. 1, drawn to a larger scale.

Fig. 5 is a perspective view of one of the segmental sections of the coupling sleeve.

In Figs. 1 and 2, the central tube 5 connects at each end one of the pipes 6, 7 to be coupled as hereinafter described and has freely mounted thereon a sleeve, indicated generally at 8, the arrangement being such that one end 5a, of said tube projects outwardly from the sleeve 8, whilst the other end 5b of tube terminates within the sleeve at a predetermined distance from that adjacent end 8a of the sleeve. The latter end 8a of the sleeve is formed with a narrow flange 8b. Sleeve 8 is longitudinally split into three complemental segmental sections 9, one of which is illustrated in Fig. 5. Each segment 9 is formed at one end with a narrow terminal flange forming in assembly the above-stated flange 8a, with the other end also flanged as at 10—Fig. 5—but of relatively smaller diameter and greater length to form in assembly, the concentric flange 10 around the tube 5 as illustrated in Figs. 1 and 2.

An annular groove 11 in the surface of the larger flange 10 receives a surclip or split spring ring 12 to maintain the segmental sections in assembly upon the central tube 5.

The abutting radial faces 9a of the segmental sections 9 within the large flange 10 have central oppositely disposed recesses 13 formed therein to receive a ball 14, which operates with a dual function to restrain relative axial movement between the sections and to provide a pivot for limited relative angular movement of said sections in radially expanding or contracting the other end 8a of the sleeve relatively to the central tube 5.

As viewed in Fig. 2 the pivot balls 14 are concentrically arranged immediately adjacent to the split ring 12 on the inner side of the latter whereby the pressure applied by said ring normally causes the closure of the sections at that end and the expansion of said sections at the other internally threaded end 8a.

Intermediate the end flanges 8b, 10, the external surface of the sections of the sleeve diverge from the larger flange 10 towards the other flange 8b, the divergent surfaces 15 terminating in flat peripheral surfaces 16 parallel to the axis of the coupling, said parallel surfaces 16 being either square or hexagonal in contour. In the construction illustrated in Figs. 1 to 3 the sections in assembly form between the end flanges a truncated hexagonal pyramid the base of which terminates in a correspondingly shaped prism, i. e. the surfaces 16.

Slidably disposed upon the above described surfaces 15, 16 between end flanges 8a—10 is a clamping ring 17, which when moved towards the flange 8a engages surface 16 and closes or contracts the segmental sections 9 of the sleeve; return movement of the ring from surface 16 to a position adjacent the large flange 10 permits the segmental sections to expand. As will be understood the bore of the clamping ring 17 has a cross section corresponding to the cross section of the surface 16. In assembling the sleeve the clamping ring 17 is slipped over the larger flange 10 of the sleeve prior to the insertion of the spring clip 12 into the annular groove 11, the diameter of said clip being greater than the maximum width of the clamping ring 17 to prevent the latter from sliding off the sleeve.

Each segmental section 9 at the end 8a is internally threaded as 18 for a lineal distance approximating the length of the flat surfaces 16, to provide in assembly an internally threaded recess 18a (Fig. 2) in the expansible end of the sleeve.

An externally threaded nipple 19 is arranged upon the end of the pipe 7 to be coupled, the thread 19a upon the nipple having a pitch corresponding to that of the threaded recess 18a to mesh therewith when the expansible end of the sleeve is contracted, as hereinafter described.

The outer end of the central tube 5 is formed with a collar 20 and with an outwardly directed threaded extension 21 with a nipple 21a to engage a complementary socket 21b formed in an internally threaded collar 22 on the end of the pipe 6, when said collar is brought into engagement with the threaded extension 21.

The inner end of the central tube 5 has a flange 23 with conical socket 24 around the bore 25 of the tube to receive the nipple 19 on the end of the pipe 7. A spring 27 disposed on the tube 5 between the collar 20 and large flange 10 operates to normally retain the sleeve 8 and tube 5 in the predetermined relationship viewed in Fig. 1.

To couple the pipes 6, 7 as illustrated in Figs. 1, 2, the threaded extension 21 of tube 5 is first screwed into the threaded collar 22 on the pipe 6, whereby the nipple 21 is seated within the socket 21, to effect a fluid tight joint between said tube and the pipe 6.

The threaded nipple 19 of pipe 7 is then introduced into the threaded end 8a of the sleeve 8, the sections 9 of which are in expanded form, with the clamping ring located against the other larger flange 10 of said sleeve.

The clamping ring 17 is slid along the sleeve towards flange 8a to engage the flat surfaces of said sleeve, and on being moved over the latter to a position against flange 8a contracts said sections whereby the internal threaded recess 18a of the sleeve 8 closes into threaded engagement with the thread portion 19a of nipple 19.

During contraction the sections of the sleeve describe a limited angular movement upon the pivot balls 14, so that as the expansible end 8a is closing there is a slight expansion of the other end of said sleeve, the spring ring 12 expanding commensurately with such expansion without disengaging from the groove 11.

The sleeve 8 is then rotated, by turning the clamping ring 17 to axially advance the threaded nipple 19 of pipe 7 into fluid tight engagement with the socket 24 upon the inner end of the central tube 5, whereby pipe 7 is then coupled to pipe 6.

The coupling described therefore provides a simple and convenient means for coupling pipes in which turning or rotation of the pipes is unnecessary as the central tube 5 is initially threaded into one pipe 6, and the sleeve 8 when contracted onto the end of the pipe 7 by the interengagement of the screw threaded parts draws the end of the latter pipe into the fluid tight engagement with the end of the tube 5 as described, to effect a fluid tight coupling of the pipes.

It is a feature of the invention that the sleeve 8 constructed as hereinbefore described may be separately employed as nut for the detachable connection of engaging parts or members in other mechanical constructions apart from the pipe coupling. The tube 5 is dispensed with and sleeve used in conjunction with the clamping ring 17.

For instance in assembling of machines or frames where parts require to be expeditiously secured in a temporary position or in a position in which a spanner could not be employed, the sleeve 8 could be used with advantage to temporarily bolt one part to another.

In a particular example, the machining of a bearing for a crank shaft, wherein the bearings are constantly assembled and dismantled in testing the bore of the bearing, to obtain an accurate fit for the particular shaft to be employed therewith, the operation would be considerably simplified and expedited by the use of bolts and a nut according to the invention for securing and dismantling the bearing parts until the machining operation is completed.

I claim:

1. A pipe coupling comprising a sleeve rotatable relatively to and so arranged upon said pipe that one end of the latter is disposed within an internally threaded end of said sleeve which is comprised of a number of separate longitudinal and segmental sections, a resilient member arranged about the other end of said sleeve to retain said sections in yieldable pressure engagement, a number of concentrically arranged balls recessed between the abutting faces of said sections adjacent said member and intermediate the latter and the internally threaded end of the sleeve whereby said latter end is normally in an expanded condition to permit the free introduction of an externally threaded union part on the pipe to be coupled, a complementary union part upon the first mentioned pipe, and means slidably disposed upon said sections for contracting the expanded ends of said sections into threaded engagement with the threaded union part so as to effect by the subsequent rotation of the sleeve fluid tight engagement between said union and complementary union part.

2. A pipe coupling comprising a pipe, a sleeve rotatable relatively to and so arranged upon said pipe that one end of the latter is disposed within an internally threaded end of said sleeve which is comprised of a number of separate complementary and longitudinal sections, a spring concentrically disposed about the other end of the sleeve to retain said sections in yieldable pressure engagement, a number of concentrically arranged balls recessed between the abutting faces of said sections adjacent said member and intermediate the latter and the internally threaded ends of the sections whereby said latter ends are normally in an expanded condition to permit the free introduction of an externally threaded union part on the pipe to be coupled, a complementary union part upon the first mentioned pipe, and means slidably disposed upon said sections for contracting the expanded ends of said sections into threaded engagement with the threaded union part so as to effect by the subsequent rotation of the sleeve fluid tight engagement between said union and complementary union part.

3. A pipe coupling comprising a tube, a sleeve rotatable relatively to and so arranged upon said tube that one end of the latter projects outwardly from the sleeve and the other end is disposed within an internally threaded end of said sleeve, means on the outer end of said tube for effecting fluid connection with a pipe to be coupled, a spring arranged upon said tube between said means and adjacent end of the sleeve which is comprised of a number of separate complementary and longitudinal segmental sections, a resilient member arranged concentrically about the latter end of said sleeve to retain said sections in yieldable pressure engagement, said sections arranged in pivotal engagement adjacent to and between said member and the internally threaded ends of said sections whereby the latter ends are normally in an expanded condition to permit the free entry of an externally threaded union part upon the other pipe to be coupled, a complementary union part upon the end of the first mentioned pipe, and means for contracting the expanded ends of said sections into threaded engagement with the threaded union part so as to effect by the subsequent rotation of the sleeve fluid tight engagement between said union and complementary union part.

4. A pipe coupling comprising a tube, a sleeve rotatable relatively to and so arranged upon said tube that one end of the latter projects outwardly from the sleeve and the other end is disposed within an internally threaded end of said sleeve, means on the outer end of said tube for effecting fluid tight connections with a pipe to be coupled, a spring arranged upon said tube between said means and adjacent end of the sleeve which is comprised of a number of separate complementary and longitudinal segmental sections, a spring concentrically disposed about the latter end of said sleeve to retain said sections in yieldable pressure engagement a number of concentrically arranged balls recessed between the abutting faces of said sections adjacent said spring between the latter and the internally threaded ends of said sections whereby the latter ends are normally in an expanded condition to permit the free entry of an externally threaded union part upon the pipe to be coupled, a complementary union part upon the internal end of the tube, and means for contracting the expanded ends of said sections into threaded engagement with the threaded union part so as to effect by the subsequent rotation of the sleeve fluid tight engagement between said union and complementary union part.

WILLIAM THOMAS PROWD.